Nov. 29, 1927.
M. LATOUR
1,650,947
DYNAMO ELECTRIC MACHINE
Filed Sept. 29, 1924
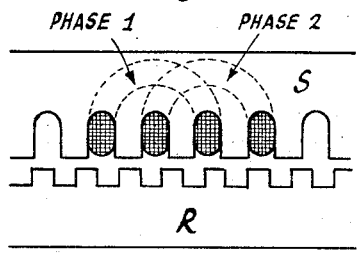
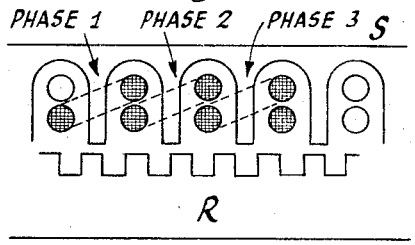
MARIUS LATOUR
INVENTOR
BY *Ira J. Adams*
ATTORNEY Patented Nov. 29, 1927.

1,650,947

UNITED STATES PATENT OFFICE.

MARIUS LATOUR, OF PARIS, FRANCE, ASSIGNOR TO LATOUR CORPORATION, OF JERSEY CITY, NEW JERSEY, A CORPORATION OF DELAWARE.

DYNAMO-ELECTRIC MACHINE.

Application filed September 29, 1924, Serial No. 740,424, and in France April 5, 1924.

The invention relates to multi-phase alternators of the high frequency type adapted to wireless telegraphy.

These alternators are of the homopolar type and the invention is characterized by the relations established between the number of the slots on the stator and the number of the pole projections on the rotor in these alternators. In my U. S. Letters Patent No. 1,234,914 there is disclosed a method of providing relatively large spaces for the stator windings in a homopolar high frequency alternator, by adopting a certain general universal relation between the number of rotor teeth and the number of stator teeth. The disclosure in that patent referred to a single phase alternator, that is, an alternator in which the currents in half of the stator slots are all of the same phase, and the currents in the other half of the slots being return currents, are in effect of opposite phase.

The purpse of the present invention is to apply methods analogous to those of the above-mentioned patent, but to polyphase alternators instead of to single-phase alternators. The same advantage of providing relatively large spaces for the stator windings is attained. This result is even more important in polyphase alternators than in single-phase alternators as it has been the usual practice to employ more stator slots in polyphase than in single-phase machines.

In the above-mentioned patent, I have given the following rule: That the number of stator teeth should be $2m$ and the number of rotor teeth $(2n+1)m$, where $m$ and $n$ are any positive integers. In the expression $2m$, the factor 2 represents essentially the number of phases of the currents in the stator slots, that is, currents in one direction in half the slots and in the reverse direction in the other half. The factor $(2n+1)$ represents essentially any number prime to 2, that is—any odd number.

Now the rule which is applicable to polyphase machines is of the same general form as that for single-phase machines; that the number of stator teeth should be $pm$ and the number of rotor teeth $qm$, where $m$ is any positive integer, $p$ is the number of stator phases, and $q$ is any odd integer prime to $p$, preferably $q$ should be greater than $p$, but not very much greater.

Take the case of what is ordinarily called a two-phase, but which is, more exactly speaking, a four-phase alternator (because the current delivered by such alternator corresponds to four currents $\frac{360}{4}$ or 90° apart, just as three phase current corresponds to three currents $\frac{360}{3}$ or 120° apart) comprising $4m$ stator slots, where $m$ is any desired whole number or integer. In conformity with the present invention, the number of pole projections or teeth in the rotor is made equal to $(2n+1)m$, $n$ being any desired whole number, for the expression $(2n+1)$ represents any number prime to 4, as stated for $q$ in the preceding paragraph. There shall more particularly be considered the case of $n=2$ whence there results a ratio of 4:5 between the number of stator slots and the number of pole projections in the rotor.

Fig. 1 illustrates the invention as applied to a two-phase machine; Fig. 2, as applied to a three-phase alternator.

Fig. 1 illustrates the idea underlying this invention in connection with a homopolar machine the rotor of which is denoted by R, anl the stator by S. The coils of two distinct phases are expressly indicated in Fig. 1. The sectional shape of the stator and rotor teeth is given for the sake of example.

Take further the case of a three-phase alternator comprising $3m$ stator slots, where $m$ again is any desired integer. In conformity with the invention the number of pole projections in the rotor is chosen at $qm$, $q$ being any desired odd whole number prime to 3, and there shall more particularly be taken the case of $q=5$ which results in a ratio of 3:5 between the number of stator slots and the number of rotor teeth.

Fig. 2 shows this latter embodiment of the invention. The coils of the three phases are indicated especially in this figure, but the shape of the stator teeth and the rotor teeth 6 is again merely shown by way of example.

The case could further be considered in which six-phase currents are dealt with, it being noted that for $6m$ slots in the rotor there are provided $qm$ projections or teeth on the rotor, $q$ being prime to 6.

The advantage offered by three-phase currents, as is well known, resides in that they lend themselves particularly for the tripling of the frequency, while allowing of a notable saving in condensers and auxiliary coils.

With an even number of phases as in Fig. 1 and with the tooth width approximately equal to the slot width on the rotor, the tooth width on the stator may advantageously be made approximately equal to the tooth width on the rotor, as illustrated. On the other hand, with an odd number of phases, as in Fig. 2, the stator tooth width will need to differ from the rotor width in order to maintain constant reluctance between the rotor and the stator as required in a homopolar machine.

While I have shown and described various preferred embodiments of my invention I do not limit myself to the same, but may employ such other modifications as come within the spirit and scope of my invention.

Claims:

1. A homopolar polyphase high-frequency generator of $p$ phases having $pm$ teeth on the stator, a winding on each of said teeth, and $qm$ teeth or polar projections on the rotor, where $m$ is an integer and $q$ is an odd integer greater than $p$ and prime to $p$.

2. A homopolar polyphase high-frequency generator of 4 phases having $4m$ teeth on the stator, a winding on each of said teeth, and $(2n+1)m$ teeth or polar projections on the rotor, where $m$ is an integer and $n$ is an integer greater than 1.

3. A homopolar polyphase high-frequency generator of 4 phases, having $4m$ teeth on the stator, a winding on each of said teeth, and $5m$ teeth or polar projections on the rotor.

4. A homopolar polyphase high-frequency generator of an even number of phases $p$ having $pm$ teeth on the stator, a winding on each of said teeth, and $qm$ teeth or polar projections on the rotor, where $m$ is an integer and $q$ is an integer greater than $p$ and prime to $p$, the tooth width and slot width on the rotor being approximately equal and the tooth width on the stator being approximately equal to the tooth width on the rotor.

MARIUS LATOUR.